United States Patent
Dahn et al.

[11] Patent Number: 5,824,280
[45] Date of Patent: Oct. 20, 1998

[54] ELECTRODES FOR LITHIUM ION BATTERIES USING POLYSILOXANES

[75] Inventors: Jeffery Raymond Dahn, Surrey, Canada; Katsuya Eguchi, Kanagawa-ken, Japan; Alf M. Wilson, Vancouver, Canada; Weibing Xing, Burnaby, Canada; Gregg Alan Zank, Midland, Mich.

[73] Assignee: Dow Corning Corporation, Midland, Mich.

[21] Appl. No.: 664,278

[22] Filed: Jun. 11, 1996

[51] Int. Cl.⁶ .................................................. H01M 4/48
[52] U.S. Cl. ............................................ 423/325; 429/218
[58] Field of Search ........................... 423/325; 429/218, 429/232

[56] References Cited

U.S. PATENT DOCUMENTS 5,556,721  9/1996  Sasaki et al. ............................ 429/218

FOREIGN PATENT DOCUMENTS

| | | |
|---|---|---|
| 582173 | 2/1994 | European Pat. Off. . |
| 0685896 | 4/1995 | European Pat. Off. ......... H01M 4/58 |
| 0692833 | 6/1995 | European Pat. Off. ......... H01M 4/58 |
| 06 096759 A | 4/1994 | Japan . |

OTHER PUBLICATIONS

Solid State Ionics, "Lithium insertion in pyrolyzed siloxane polymers" Wilson et al., 74(1994) 249–254 (month unknown).

J. Electrochem, "Dramatic Effect of Oxidation on Lithium Insertion in Carbons Made from Epoxy Resins" Xue et al, vol. 142, No. 11 Nov., 1995, pp. 3668–3677.

J. Electrochem, "An Epoxy–Silane Approach to Prepare Anode Materials for Rechargeable Lithium Ion Batteries" Xue et al, vol. 142 No. 9 Sep. 1995 pp. 2927–2935.

Primary Examiner—Stephen Kalafut
Attorney, Agent, or Firm—Sharon K. Severance

[57] ABSTRACT

A lithium ion battery electrode formed by the pyrolysis of a siloxane polymer of the structure $$(R^1R^2R^3SiO_{0.5})_w(R^4R^5SiO)_x(R^6SiO_{1.5})_y(SiO_{4/2})_z$$

followed by introducing lithium ions. In this structure, each $R^1$, $R^2$, $R^3$, $R^4$, $R^5$ and $R^6$ are independently selected from the group consisting of hydrogen and a hydrocarbon, w is in the range of 0 to about 0.8, x is in the range of 0 to about 0.9, y is in the range of 0 to about 0.9, z is in the range of 0 to 1 and $w+x+y+z=1$.

12 Claims, 1 Drawing Sheet a) IS PITCH (ASHLAND)
b) IS 89-6 AT 5C/MIN.
c) IS 89-3 5C/MIN.

a) IS PITCH (ASHLAND)
b) IS 89-6 AT 5C/MIN.
c) IS 89-3 5C/MIN.

ELECTRODES FOR LITHIUM ION BATTERIES USING POLYSILOXANES

BACKGROUND OF THE INVENTION

The present invention relates to a method of forming electrodes for rechargeable lithium ion batteries and the electrodes formed thereby. These electrodes can be used to form batteries with high capacities.

Lithium ion batteries are known in the art and are widely used as electric sources for lap top computers, cellular phones, camcorders and the like. They are advantageous in that they can provide high voltage, high energy density, small self-discharge, excellent long-term reliability and the like.

Rechargeable lithium ion batteries have a simple mechanism. During discharge, lithium ions are extracted from the anode and inserted into the cathode. On recharge, the reverse process occurs. The electrodes used in these batteries are very important and can have dramatic effects on the batteries' performance.

Positive electrodes known in the art for use in these rechargeable lithium ion batteries include metal chalcogenides, metal oxides, conductive polymers and the like. Negative electrodes (anodes) known in the art for use in rechargeable lithium ion batteries include compounds in which the lithium ion is incorporated into a crystal structure of inorganic materials such as $WO_2$, $Fe_2O_3$ and the like, and carbonaceous materials such as graphite and conductive polymers.

Properties which are desirable in electrode materials include 1) chemical inertness towards the other battery components such as the lithium ions, the electrolyte salts and the electrolyte medium; 2) the ability to store high quantities of lithium; 3) the ability to reversibly store or bind the lithium; 4) lithium storage that minimizes formation of metallic lithium clusters or agglomerates and, thus, minimizes safety concerns; and 5) a high density which allows for volume efficiency.

The electrodes to date, however, have not maximized these properties. For instance, while lithium metal provides the best electrode potential, large batteries constructed therewith have poor safety behavior. Likewise, while lithium alloys have reasonable electrode potentials and safety profiles, they often crack and fragment with the constant cycling of the battery.

The most desirable anode materials to date have been carbonaceous compounds such as graphite. Graphite is chemically inert, can bind reasonable amounts of lithium (cells with capacities of about 330 mAh/g of anode) with little being irreversible (about 10%), and it has a high density (about 2.2 $g/cc^2$, although in the electrode the density is about 1.2 $g/cc^2$). Cells with larger capacities, however, are often desired. References which discuss the use of graphite anodes include Dahn et al.; Science, 270, 590–3 (1995), Zheng et al., Chemistry of Materials, 8, 389–93 (1996); Xue et al.; J. of Electrochem. Soc., 142, 3668 (1995), Wilson et al.; Solid State Ionics, 74, 249–54 (1994), Wilson et al.; J. of Electrochem. Soc., 142, 326–32 (1995) and Xue et al.; J. of Electrochem. Soc., 142, 2927 (1995).

It has recently been suggested that the addition of boron, phosphorous or metals such as silicon to carbonaceous anodes can increase the capacity of the resultant batteries. Such batteries, however, have not achieved optimal results.

For instance, Tahara et al. in European publication 582,173 teach the use of a silicon oxide or a silicate as the negative electrode in a lithium ion battery. Similarly, Dahn et al. in European publication 685,896 teach the use of SiC containing materials as anodes in lithium ion batteries. These references, however, do not teach the methods or materials claimed herein.

The present inventors have now discovered that lithium ion batteries containing electrodes made from specific pre-ceramic polysiloxanes can have many desirable properties heretofore unobtainable. For instance, such batteries can have large capacities with low irreversible capacity. In addition, these anode materials are chemically inert towards the other battery components, they minimize the agglomeration of lithium, they have a high density and they can be designed to have low hysteresis or a larger hysteresis which may reduce reaction rates between intercalated lithium and electrolyte under thermal abuse.

SUMMARY OF THE INVENTION

The present invention relates to a method of forming an electrode for a lithium ion battery. The method comprises first pyrolyzing a siloxane polymer to form a ceramic material. The siloxane polymer has the structure:

In this structure, $R^1$, $R^2$, $R^3$, $R^4$, $R^5$ and $R^6$ are independently selected from the group consisting of hydrogen and a hydrocarbons of 1–20 carbon atoms, w is in the range of 0 to about 0.8, x is in the range of 0 to about 0.9, y is in the range of 0 to about 0.9, z is in the range of 0 to 0.9 and w+x+y+z=1. Lithium ions are then incorporated into the ceramic material to form the electrode.

DETAILED DESCRIPTION OF THE INVENTION

Figure 1:
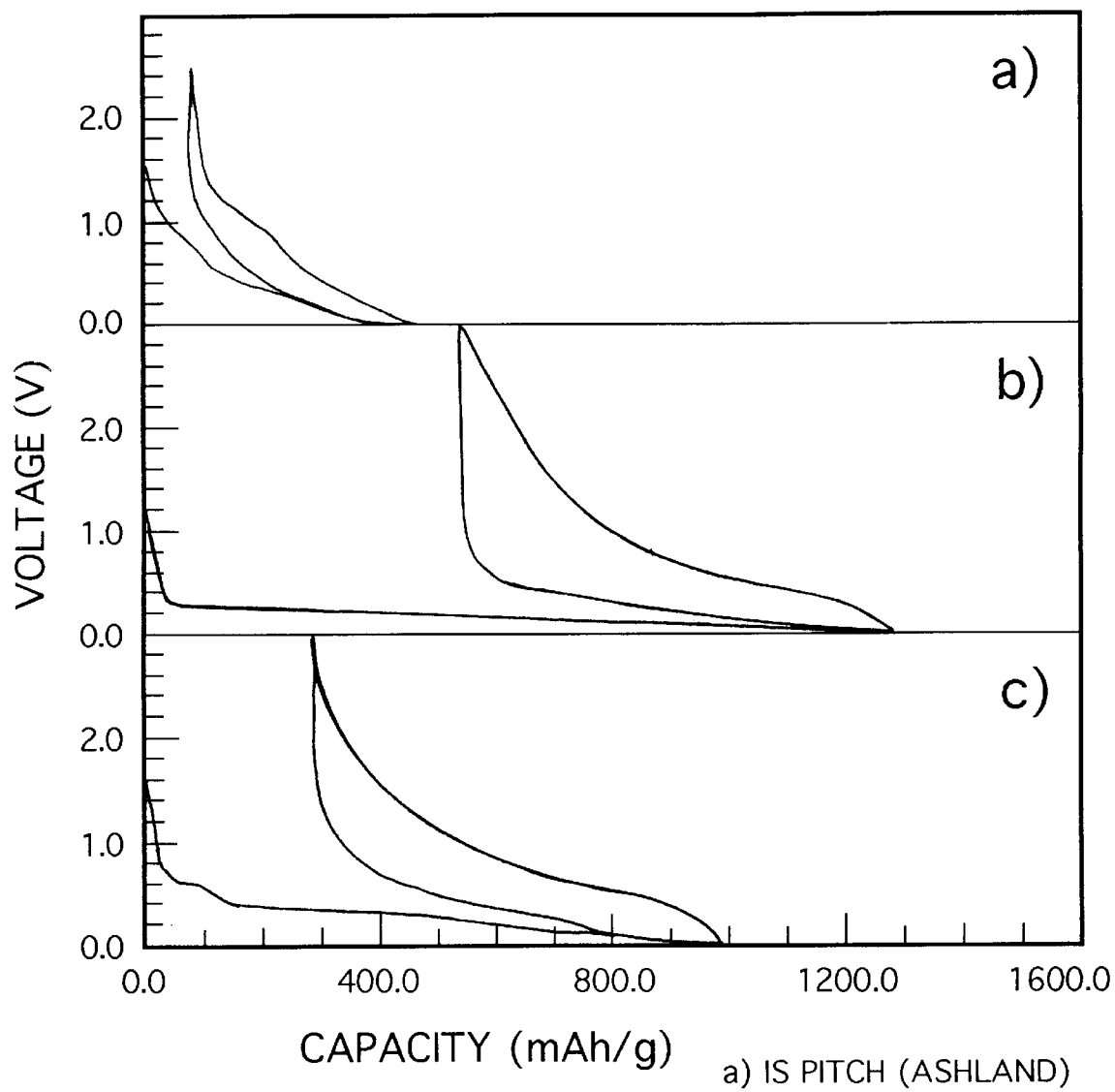
FIG. 1 shows typical charge voltage curves for the materials of the invention.

The present invention is based on the unexpected discovery that lithium ion batteries containing anodes derived from specific polysiloxanes (also referred to as siloxane polymers or organopolysiloxanes) can provide the batteries with highly desirable properties. For instance, such batteries can have large capacities (the electrodes have the ability to store large quantities of lithium) with low irreversible capacity (the lithium is reversibly stored). In addition, these anode materials are chemically inert towards the other battery components, they minimize the agglomeration of lithium and they have a high density.

The electrodes of the present invention are formed from siloxane polymers of the structure:

$(R^1R^2R^3SiO_{0.5})$ units in this structure are often referred to as "M" units. $(R^4R^5SiO)$ units in this structure are often referred to as "D" units. $(R^6SiO_{1.5})$ units in this structure are often referred to as "T" units. $(SiO_{4/2})$ units in this structure are often referred to as "Q" units.

In the above structure, $R^1$, $R^2$, $R^3$, $R^4$, $R^5$ and $R^6$ are independently selected from the group consisting of hydrogen and hydrocarbons of 1–20 carbon atoms. The hydrocarbons can include alkyls such as methyl, ethyl, propyl, butyl and the like, alkenyls such as vinyl, allyl and the like, and aryls such as phenyl. In addition, the above hydrocarbon radicals can contain hetero atoms such as silicon, nitrogen or boron. w, x, y and z in this structure comprise the molar ratio of the units with the total of w+x+y+z=1. w is in the range of 0 to about 0.8, x is in the range of 0 to about 0.9, y is in the range of 0 to about 0.9 and z is in the range of 0 to 0.9. Preferably, w is less than or equal to 0.6, x is less than or equal to 0.8, y is between about 0.3 and about 0.9 (inclusive) and z is between about 0.3 and about 0.9 (inclusive). These polymers are generally well known in the art.

It should be noted that the term polysiloxane as used herein is intended to include copolymers or blends of the above polysiloxanes and other polymers which are also useful herein. For instance, copolymers of polysiloxanes and silalkylenes [$R_2Si(CH_2)nSiR_2O$] (eg., silethylene), silarylenes (eg., silphenylene [$R_2Si(C_6H_4)nSiR_2O$]), silazanes [$R_2SiN$], silanes [$R_2Si$—$SiR_2$], organic polymers and the like can be used herein. Moreover, blends of polysiloxanes and the above mentioned polymers are also useful herein.

Generally, the siloxane polymer should be capable of being converted to ceramic materials with a ceramic char yield greater than about 20 weight percent. However, those with higher yields, such as greater than about 30 weight percent, preferably greater than about 50 weight percent and more preferably greater than 70 weight percent, are often used.

The above polymers should generally provide a char with at least an excess of carbon (eg., >0.05 wt. % based on the weight of the char). Although not wishing to be bound by theory, it is thought that the excess carbon forms a continuous network for the lithium ions. Larger excesses of carbon (eg., >5 wt. %) are often preferred.

What is meant by "excess carbon" in this invention is the amount of free or excess carbon derived from the polysiloxane (i.e., that not bound to Si or O) during pyrolysis expressed as a weight percentage based on the weight of the char.

The amount of free carbon derived from the polysiloxane is determined by pyrolysis of the polymer to an elevated temperature under an inert atmosphere until a stable ceramic char is obtained. For purposes of this invention, a "stable ceramic char" is defined as the ceramic char produced at an elevated temperature (e.g., 700°– 1400° C.).

Both the ceramic yield and the silicon, oxygen and carbon content of the stable ceramic char are then determined. Using a composition rule of mixtures, the amount of excess carbon in the stable ceramic char can be calculated (the amount of "excess carbon" in the char is calculated by subtracting the theoretical amount of carbon bound to silicon from the total carbon present). The amount of excess carbon thus calculated is normally expressed as a weight percent based on the weight of the char derived from the polysiloxane.

If the desired amount of free carbon cannot be incorporated into the polymer, an additional source of carbon may be added. Examples include elemental carbon, phenolic resin, coal tar, high molecular weight aromatic compounds, derivatives of polynuclear aromatic hydrocarbons contained in coal tar and polymers of aromatic hydrocarbons.

As long as the polysiloxane meets these criteria, its structure is not critical. Examples of specific siloxane units include [$PhSiO_{1.5}$], [$MeSiO_{1.5}$], [$HSiO_{1.5}$], [$MePhSiO$], [$Ph_2SiO$], [$PhViSiO$] [$ViSiO_{1.5}$], [$MeHSiO$], [$MeViSiO$], [$Me_2SiO$], [$Me_3SiO_{0.5}$], [$Ph_2ViSiO_{0.5}$], [$Ph_2HSiO_{0.5}$], [$H_2ViSiO_{0.5}$], [$Me_2ViSiO_{0.5}$], [$SiO_{4/2}$] and the like. Me=methyl. Ph=phenyl and Vi=vinyl. Mixtures of polysiloxanes may also be employed.

Generally, polysiloxanes which contain phenyl groups are preferred since they add to the free carbon in the ceramic chars. Polysiloxanes which contain vinyl groups are also preferred since vinyl groups attached to silicon provide a mechanism whereby the polymer can be cured prior to pyrolysis. Polysiloxanes where R is almost exclusively methyl or hydrogen are generally not suitable for use in this invention as there is insufficient free carbon in the resulting ceramic char.

The organopolysiloxanes of this invention can be prepared by techniques well known in the art. The actual method used to prepare the polysiloxanes is not critical. Most commonly, the polysiloxanes are prepared by the hydrolysis of organochlorosilanes. Such methods, as well as others, are described in Noll, *Chemistry and Technology of Silicones*, chapter 5 (translated 2d Ger. Ed., Academic Press, 1968).

The compositions of this invention may also contain curing agents which are used to crosslink the polymer prior to pyrolysis. These curing agents are generally known in the art and may include those activated by heating the green body containing the curing agent to temperatures in the range of 50°–300° C. (i.e., the activation of a free radical precursor) or they may be crosslinked at room temperature. Additionally, conventional condensation type curing and curing agents may also be used herein.

Curing agents are well known in the art. Examples include free radical precursors such as organic peroxides (dibenzoyl peroxide, bis-p-chlorobenzol peroxide, bis-2,4-dichlorobenzol peroxide, di-t-butyl peroxide, dicumyl peroxide, t-butyl perbenzoate, 2,5 -bis(t-butylperoxy)-2,3-dimethylhexane and t-butyl peracetate); and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the siloxane polymer. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

Examples of crosslinking agents include, for example, polyfunctional organosilicon compounds such as silanes, silazanes or siloxanes. The preferred crosslinking agents are organosilicon compounds with Si—H or Si—Vi functional bonds.

The addition of other materials is also within the scope of this invention. For instance, it is within the scope of the invention to add fillers such as amorphous or ceramic powder (eg., carbon, colloidal silica, etc.), solvents, surfactants or processing aids such as lubricants, deflocculants and dispersants.

The polysiloxane and any optional ingredients are often cured prior to pyrolysis to increase the char yield. Curing procedures are well known in the art. Generally, such curing can be carried out by heating the article to a temperature in the range of about 50° to 450° C., preferably in an inert atmosphere such as argon or nitrogen.

The polysiloxane is then pyrolyzed in an inert atmosphere and/or under vacuum to a temperature of 700° C. or more. The preferred pyrolysis temperature is about 800° to 1400° C.

Inert atmospheres are used during pyrolysis to prevent oxygen incorporation into the ceramic, or loss of carbon through combustion. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr.

If desired, however, a reactive gas such as silane, methane, $H_2$, $O_2$, or $NH_3$ may be used to chemically change the composition of the ceramic from that derived by pyrolysis in an inert atmosphere.

Pyrolysis may be performed in any conventional high temperature furnace equipped with a means to control the furnace atmosphere. Such furnaces are well known in the art and many are commercially available.

The temperature schedule for pyrolysis has been found to be important in the present invention. Generally, heating temperatures should be at a rate less than about 50° C./minute and preferably less than about 10° C./minute.

The resultant ceramics contain silicon, carbon, oxygen and/or hydrogen in a wide array of proportions, based on the composition of the polysiloxane. For instance, the material can have a composition of:

$$SiO_xC_y$$

wherein x=0 to 4 and y=0 to 100. Although unaccounted for in this formula, hydrogen may also be present in small amounts (e.g., <5 wt. %).

Applicants have discovered, however, that ceramic materials of the composition:

$$SiO_xC_y$$

wherein x=0.43 to 3.5, y=0.43 to 2.8 and x+y is greater than or equal to 1.8 and less than or equal to 6.3 produce electrodes with the ability to reversibly store high quantities of lithium. More preferred are materials wherein x=0.43 to 2.0, y=1.25 to 2.35 and x+y is greater than or equal to 1.86 and less than or equal to 4.35. Most preferred are materials wherein x=0.43 to 1.67, y=1.0 to 2.2 and x+y is greater than or equal to 1.86 and less than or equal to 3.8.

Likewise, Applicants have discovered that ceramic materials of the composition:

$$SiO_xC_y$$

wherein x=0.5 to 1.55, y=2.5 to 9.4 and x+y is greater than or equal to 3.4 and less than or equal to 10.8 produce electrodes with the ability to reversibly store high quantities of lithium and yet have relatively low recharge voltages (low hysteresis).

As noted above, when these types of materials are used as electrodes in lithium ion batteries, they provide the batteries with many desirable properties. For instance, such batteries can have large capacities with low irreversible capacity. In addition, these anode materials are chemically inert towards the other battery components, they minimize the agglomeration of lithium and they have a high density. Finally, these materials can be designed to have low hysteresis or a larger hysteresis. The Applicants herein postulate that the hysteresis of these materials may be valuable since it may reduce reaction rates between intercalated lithium and electrolyte under thermal abuse.

It is often preferred to process the ceramic material which results from the above pyrolysis into a powder form for use in the electrodes. This can be accomplished by techniques known in the art such as grinding, milling spray drying and the like.

Alternatively, however, the polysiloxane can be molded into the desired shape before pyrolysis followed by heating to produce the shaped electrode. For instance, the polysiloxane can be polymerized to a gel particle and then pyrolyzed.

If a ceramic powder is used, it is often mixed with variety of conductive agents, diluents or binders to assist in forming the desired shape electrode. For instance carbon black conductive diluent, N-methylpyrollidone, cyclohexanone, dibutylpthallate, acetone, or polyvinylidene fluoride binder, polytetrafluorethylene dispersed in water as a binder or ethylene propylene diene terpolymer dissolved in cyclohexanone as a binder are within the scope of the invention.

Finally, lithium ions are incorporated into the electrode. This an occur prior to insertion of the electrode into the battery by, or instance, physically incorporating the lithium in the siloxane polymer prior to pyrolysis or by mixing the lithium in the powdered ceramic material.

Preferably, however, the lithium ions are inserted after the electrode is inserted into the battery. At such time, the battery is merely "charged" by placing both the electrode of the invention and a counter electrode of, for instance, lithium transition metal oxide such as $LiCoO_2$ in a litium ion conductive non-aqueous electrolyte and then applying a current in a direction which allows incorporation of the lithium ion into the electrode of the invention.

The electrodes of the present invention can be used in any battery configuration. The preferred battery of the present invention is the conventional spiral wound type in which a cathode and anode separated by a porous sheet are wound into a "jelly roll".

The cathodes typically comprise a suitable cathode material as described in the prior at (eg., as lithiated metal oxides) applied on the surface of aluminum foil. This is often accomplished by forming a slurry of the cathode material and a binder and/or diluent and then depositing the slurry on the foil. The diluent is dried leaving a thin film of the cathode material on the foil.

Anodes are formed in the same manner as the cathode except that the ceramic of the present invention is used as the anode material and a copper foil is used in place of the aluminum foil.

As noted above, a porous sheet such as a polyolefin material is placed between the cathode and the anode and the composition is then rolled. This "jelly roll" is inserted into a conventional battery can and the can is sealed with a header and a gasket.

Before the can is sealed, an appropriate electrolyte is added to fill the pores in the porous sheet and in the electrode themselves and connections are made between the anode and cathode and the external terminals.

Those skilled in the art will understand that the type and amount of the battery components will be chosen based on component material properties and the desired performance and safety requirements of the battery. Also, the battery is generally electrically conditioned (recharged) during its manufacture.

Other configurations or components are possible. For instance, coin cells or a prismatic format are within the scope of the present invention.

The following non-limiting examples are provided so that one skilled in the art will more readily understand the invention.

I. Battery Testing

Laboratory coin cell batteries were used to determine electrochemical characteristics. These were assembled using conventional 2325 hardware and with assembly taking place in an argon filled glovebox. For purposes of analysis the experimental electrode materials were used opposite a lithium metal electrode in these coin cell batteries. A stainless steel cap and a special oxidation resistant case comprise the container and also serve as negative and positive terminals respectively. A gasket is used as a seal and also serves to separate the two terminals. Mechanical pressure is applied to the stack comprising the lithium electrode, separator, and the experimental electrode by means of a mild steel disk spring and a stainless disk. The disk spring was selected such that a pressure of about 15 bar was applied following closure of the battery. A 125 μm thick foil was used as the lithium electrode. Celgard® 2502 microporous polypropylene film was used as the separator. The electrolyte was a solution of 1M $LiPF_6$ salt dissolved in a solvent mixture of ethylene carbonate and diethyl carbonate in a volume ratio of 30/70.

Electrodes of experimental material were made using a mixture of the powdered material plus Super S (trademark of Ensagri) carbon black conductive diluent and polyvinylidene fluoride (PVDF) binder (in amounts of about 5 and 10% by weight respectively to that of the sample) uniformly coated on a thin copper foil. The powdered sample and the carbon black were initially added to a solution of 20% PVDF in N-methylpyrollidone (NMP) to form a slurry with additional NMP added to reach a smooth viscosity. The slurry was then spread, on pieces of copper foil using a small spreader, and the NMP evaporated at about 100° C. in air. Once the sample electrode was dried it was compressed between flat plates at about 25 bar pressure. Electrode squares, 1.44 $cm^2$, were then cut from the larger electrode. These electrodes were then weighed and the weight of the foil, the PVDF, and the carbon black were subtracted to obtain the active electrode mass.

After construction, the coin cell batteries were removed from the glove box, thermostated at 30°±1° C., and then charged and discharged using constant current cyclers with a ±1% current stability. Data was logged whenever the cell voltage changed by more than 0.005 V. Currents were adjusted based on the amounts of active material and the desired test conditions. Normally currents of 18.5 mAh/g of active material were used.

Cells were normally discharged to 0.0 V and then charged to 3.0 V. This is the 'first cycle'. The cells were similarly cycled two more times in succession. The capacity of the first discharge is designated $Qd_1$, the capacity of the first charge by $Qc_1$, etc. . The reversible capacity is taken here to be $Qrev=(Qc_1+Qd_2)/2$. The irreversible capacity is taken to be $Qirr=Qd_1-Qc_1$.

Typical charge voltage curves for the materials of the invention are included in FIG. 1. In this Figure, A is a carbon derived from the 1000° C. pyrolysis of pitch; B is the material of Example 6 and C is from Example 3. The Figure clearly demonstrates the differences in the charge voltages from different materials.

II. Materials

All siloxane materials were obtained from Dow Corning Corporation as intermediates or purchased from Hüls America. Lupersol 101™ is is 2,5-bis(t-butylperoxy)-2,3-dimethylhexane obtained from PennWalt Corp., Dicup "R"™ is dicumyl peroxide obtained from PennWalt Corp. and Pt#4 is an 8.6 wt. % solution of platinum in 1,3-divinyl-1,1,3,3-tetramethyldisiloxane.

Polymer pyrolysis was carried out in a Lindberg Model 54434 or similar tube furnace equipped with Eurotherm temperature controllers. In a typical pyrolysis a sample was weighed out (approximately 4.0 grams) and placed in an alumina boat and loaded into the furnace. The furnace was then purged with argon at a rate sufficient to achieve one turnover of the furnace atmosphere every 3 minutes. After purging 45 to 60 minutes the flow was reduced to allow for a turnover every 6 minutes and the temperature raised to a final temperature and held 60 minutes. The ceramic sample was then reweighed, and ground for testing and analysis.

III. Analysis

Solution NMR spectra were recorded on a Varian VXR400S or Varian 200 MHz instrument. Gel permeation chromatographic data were obtained on a Waters GPC equipped with a model 600E systems controller, model 410 differential refractometer detector interfaced to a Compaq 486/33 computer employing PE Nelson Turbochrom software; all values are relative to polystyrene standards. Thermal gravimetric analysis were recorded on an Omnitherm TGA 951 analyzer interfaced to an IBM PS/2-50 z computer with Thermal Sciences software. Carbon, hydrogen and nitrogen analysis were done on a Perkin Elmer 2400 analyzer . Oxygen analysis were done on a Leco oxygen analyzer model RO-316 equipped with an Oxygen determinator 316 (Model 783700) and an Electrode furnace EF100. Silicon analysis was determined by a fusion technique which consisted of converting the solid to a soluble form and analyzing the solute for total silicon by Arl 3580 ICP-AES analysis.

The x-ray powder diffraction was carried out on a Siemens D5000 horizontal theta—theta automated goniometer, equipped with a sample spinner, low background sample holders, graphite monochromator, scintillation counter, long fine focus Cu tube, and computer controlled operation. The solid sample is always ground to a fine powder of –100 mesh & smaller without any grit feeling by using a boron carbide grinder to minimize the contamination from grinding. Scans are made at 1 degree 2-theta per minute from 6 to 80 2-theta with the x-ray tube operated at 40 kV & 30 mA.

IV. Examples

Examples 1–14

MT Materials Cured by Peroxides

Polymer Synthesis. This is a general procedure for the synthesis of organo-functional siloxanes. Phenyltrimethoxysilane (77.0 g, 0.39 mol), methyltrimethoxysilane (742 g, 5.46 mol), 1,1,3,3-tetramethyl-1,3-divinyldisiloxane (192 g, 1.03 mol), trifluoromethanesulfonic acid (5.0 mL, 0.02 mol) and deionized water (50 g, 2.8 mol) were heated to reflux for two hours. Toluene (1.5 L) and deionized water (410 mL) were added and the mixture heated to reflux for an additional two hours. Calcium carbonate (10 g, 0.1 mol) was added and solvent was distilled until the vapor head temperature increased to ca. 85° C. Aqueous 3 wt % potassium hydroxide (50 mL, 0.27 mol) was added and the water azeotropically removed. After the reaction mixture was dry of water, reflux was continued for 8 hours, the mixture was cooled to ca. 50° C., and chlorodimethylvinylsilane (50 mL, 0.37 mol) was added. After stirring at room temperature for three days, the mixture was filtered through a Buchner funnel containing Celatom filter-aid, and the solvent removed using a rotary evaporator, giving a quantitative yield (617.6 g) of a clear, colorless viscous fluid. $^1$H-NMR (10801-142, 200 MHz, $CDCl_3$) d 7.2 (m, Ph, int=12), 5.6–6.2 (m, Vi, int=32), 0.05 (br s, Me, int=140). Composition (based on NMR): $(PhSiO_{1.5})_{0.06}(MeSiO_{1.5})_{0.66}(Me_2ViSiO_{0.5})_{0.28}$. The other polymeric materials are summarized in Table 1.

TABLE 1

Polymer Synthesis

| No. | Description |
|-----|-------------|
| 1 | $[PhSiO_{1.5}]_{0.75}[Ph_2ViSiO_{0.5}]_{0.25}$ <br>(158.8 g PhSi(OMe)$_3$ and 61.1 g (Ph$_2$ViSi)$_2$O) |
| 2 | $[PhSiO_{1.5}]_{0.75}[Me_2ViSiO_{1.5}]_{0.25}$ <br>(222.8 g PhSi(OMe)$_3$ and 34.9 g (Me$_2$ViSi)$_2$O) |
| 3 | $[PhSiO_{1.5}]_{0.5}[Me_2ViSiO_{0.5}]_{0.5}$ <br>(198.0 g PhSi(OMe)$_3$ and 93.3 g (Me$_2$ViSi)$_2$O) |
| 4 | $[PhSiO_{1.5}]_{0.5}[Ph_2ViSiO_{0.5}]0.5$ <br>(105.7 g PhSi(OMe)$_3$ and 122.3 g (Ph$_2$ViSi)$_2$O) |
| 5 | $[MeSiO_{1.5}]_{0.5}[Me_2ViSiO_{0.5}]_{0.5}$ <br>(136.0 g MeSi(OMe)$_3$ and 93.0 g (Me$_2$ViSi)$_2$O) |
| 6 | $[MeSiO_{1.5}]_{0.75}[Me_2ViSiO_{0.5}]_{0.25}$ <br>(204.0 g MeSi(OMe)$_3$ and 46.5 g (Me$_2$ViSi)$_2$O) |
| 7 | $[PhSiO_{1.5}]_{0.22}[MeSiO_{1.5}]_{0.55}[Me_2ViSiO_{0.5}]_{0.23}$ <br>(39.7 g PhSi(OMe)$_3$, 74.9 g MeSi(OMe)$_3$ and 23.3 g (Me$_2$ViSi)$_2$O) |
| 8 | $[ViSiO_{1.5}]_{0.77}[Me_2ViSiO_{0.5}]_{0.23}$ <br>(222.0 g ViSi(OMe)$_3$ and 46.5 g (Me$_2$ViSi)$_2$O) |
| 9 | $[ViSiO_{1.5}]_{0.66}[MeSiO_{1.5}]_{0.09}[Me_2ViSiO_{0.5}]_{0.25}$ <br>(192.4 g ViSi(OMe)$_3$, 27.2 g MeSi(OMe)$_3$ and 16.5 g (Me$_2$ViSi)$_2$O) |
| 10 | $[PhSiO_{1.5}]_{0.09}[MeSiO_{1.5}]_{0.66}[Me_2ViSiO_{0.5}]_{0.25}$ <br>(77.0 g PhSi(OMe)$_3$, 742.0 g MeSi(OMe)$_3$ and 192.0 g (Me$_2$ViSi)$_2$O) |
| 11 | $[PhSiO_{1.5}]_{0.38}[MeSiO_{1.5}]_{0.39}[Me_2ViSiO_{0.5}]_{0.23}$ <br>(69.4 g PhSi(OMe)$_3$, 54.5 g MeSi(OMe)$_3$ and 23.3 g (Me$_2$ViSi)$_2$O) |
| 12 | $[PhSiO_{1.5}]_{0.5}[MeSiO_{1.5}]_{0.23}[Me_2ViSiO_{0.5}]_{0.27}$ <br>(148.0 g PhSi(OMe)$_3$, 51.0 g MeSi(OMe)$_3$ and 34.9 g (Me$_2$ViSi)$_2$O) |
| 13 | $[PhSiO_{1.5}]_{0.66}[MeSiO_{1.5}]_{0.08}[Me_2ViSiO_{0.5}]_{0.26}$ <br>(193.0 g PhSi(OMe)$_3$, 20.4 g MeSi(OMe)$_3$ and 34.9 g (Me$_2$ViSi)$_2$O) |
| 14 | $[PhSiO_{1.5}]_{0.13}[ViSiO_{1.5}]_{0.64}[Me_2ViSiO_{0.5}]_{0.2}$ <br>(39.3 g PhSi(OMe)$_3$, 192.4 g MeSi(OMe)$_3$ and 46.5 g (Me$_2$ViSi)$_2$O) |

Curing and Pyrolysis. An aliquot of a polymer material (ca. 40 g) was mixed with 1 wt % Lupersol 101™ and heated to 150°–175° C. for 20 to 45 minutes. An aliquot of the cured polymer (ca. 4 g) was placed in a graphite crucible and heated under a continuous argon purge at 5° C./min to 1000° C. and held at temperature for one hour before cooling to ambient temperature. The ceramic yield was calculated and the sample analyzed as described above. The results are summarized in Table 2.

TABLE 2

Ceramic Conversion

| Ex | Ceramic Yield | % C | % H | % Si | % O | XRD* |
|----|---------------|-----|-----|------|-----|------|
|    |               | (percent by weight) | | | | |
| 1  | 77.7 | 51.7 | 0.51 | 31.4 | 22.5 | G&O |
| 2  | 65.3 | 48.3 | 0.53 | 26.9 | 23.3 | G&O |
| 3  | 62.2 | 48.0 | 0.46 | 29.9 | 22.9 | G&O |
| 4  | 59.9 | 58.9 | 0.65 | 22.3 | 29.6 | G&O |
| 5  | 60.1 | 25.2 | 0.48 | 42.8 | 34.7 | O |
| 6  | 82.5 | 20.6 | 0.51 | 44.1 | 29.5 | O |
| 7  | 79.2 | 32.0 | 0.38 | 37.9 | 26.9 | O |
| 8  | 85.5 | 29.9 | 0.23 | 38.1 | 26.8 | O |
| 9  | 85.3 | 29.7 | 0.19 | 38.3 | 26.8 | O |
| 10 | 85.9 | 25.9 | 0.61 | 41.4 | 30.2 | O |
| 11 | 79.9 | 38.6 | 0.67 | 34.1 | 24.9 | G&O |
| 12 | 75.7 | 42.7 | 0.67 | 31.6 | 22.2 | G&O |
| 13 | 75.9 | 47.1 | 0.58 | 28.8 | 20.3 | G&O |
| 14 | 83.4 | 35.5 | 0.37 | 36.2 | 26.1 | G&O |

*O indicates a silica glass XRD pattern with broad reflections centered at 24° and 68° theta.
G indicates a graphene pattern with a broad reflection centered at about 44 degrees 2 theta.

Battery Cell Testing An aliquot of the ceramic material was made into an electrode as described above and assembled into a test cell as described above. The results are summarized in Table 3.

TABLE 3

Battery Testing

| Ex No | Pyrolysis Rate (°C./min) | Reversible Capacity (mAh/g) | Irreversible Capacity (mAh/g) | Avg Charge Voltage | Avg Discharge Voltage |
|-------|--------------------------|------------------------------|-------------------------------|--------------------|-----------------------|
| 1  | 45.0 | 564 | 352 | 1.0  | 0.35 |
|    | 5.0  | 574 | 319 | 0.96 | 0.36 |
| 2  | 45.0 | 770 | 378 | 1.0  | 0.34 |
| 3  | 45.0 | 669 | 352 | 0.89 | 0.33 |
|    | 5.0  | 696 | 293 | 0.83 | 0.33 |
| 4  | 45.0 | 553 | 337 | 0.95 | 0.34 |
|    | 5.0  | 659 | 275 | 0.83 | 0.35 |
| 5  | 45.0 | 758 | 471 | 1.09 | 0.26 |
| 6  | 45.0 | 570 | 573 | 1.15 | 0.26 |
|    | 5.0  | 751 | 580 | 1.03 | 0.22 |
| 7  | 5.0  | 846 | 341 | 1.07 | 0.31 |
| 8  | 5.0  | 900 | 304 | 1.05 | 0.32 |
| 9  | 5.0  | 870 | 364 | 1.05 | 0.29 |
| 10 | 5.0  | 744 | 360 | 1.12 | 0.25 |
| 11 | 5.0  | 800 | 315 | 1.03 | 0.29 |
| 12 | 5.0  | 790 | 300 | 0.91 | 0.32 |
| 13 | 5.0  | 740 | 295 | 0.98 | 0.33 |
| 14 | 5.0  | 660 | 450 | 1.13 | 0.25 |

Examples 15–20

MT Materials Cured by Pt

Polymer Synthesis. This is a general procedure for the synthesis of organofunctional siloxanes. Phenyltrimethoxysilane (198.0 g, 1.0 mol), 1,1,3,3-tetramethyl-1,3-dihydridodisiloxane (67 g, 1.0 equivalent), trifluoromethanesulfonic acid (2.0 mL, 0.01 mol) and deionized water (1.0 g) were heated to reflux for two hours. The reaction was cooled and 110 g of additional water added, and the reaction heated again to reflux for 2 h. Calcium carbonate (2 g, 0.02 mol) was added and solvent was distilled until the vapor head temperature increased to ca. 85° C. Toluene (290 g), deionized water (29 mL) and trifluoroacetic acid (0.9 g) were added and the mixture heated to reflux and the water azeotropically removed. After the reaction mixture was dry of water, reflux was continued for 2 hours, the mixture was cooled to ca. 50° C., and chlorodimethylsilane (5 g) was added. After stirring at room temperature for 16 h, the mixture was filtered through a sintered glass funnel containing Celatom filter-aid, and the solvent removed using a rotary evaporator, giving a nearly quantitative yield (195 g) of a clear, colorless viscous fluid. The other materials are summarized in Table 4.

TABLE 4

Polymer Synthesis

| No. | Description |
|-----|-------------|
| 15 | $[PhSiO_{1.5}]_{0.75}[Ph_2HSiO_{0.5}]_{0.25}$ <br>(148.5 g PhSi(OMe)$_3$ and 47.8 g (Ph$_2$HSi)$_2$O) |
| 16 | $[PhSiO_{1.5}]_{0.5}[Ph_2HSiO_{0.5}]_{0.5}$ <br>(99.0 g PhSi(OMe)$_3$ and 95.5 g (Ph$_2$HSi)$_2$O) |
| 17 | $[PhSiO_{1.5}]_{0.5}[Me_2HSiO_{0.5}]0.5$ <br>(198.0 g PhSi(OMe)$_3$ and 67.0 g (Me$_2$HSi)$_2$O) |
| 18 | $[MeSiO_{1.5}]_{0.5}[Me_2HSiO_{0.5}]_{0.5}$ <br>(136.0 g MeSi(OMe)$_3$ and 67.9 g (Me$_2$HSi)$_2$O) |
| 19 | $[PhSiO_{1.5}]_{0.75}[Me_2HSiO_{0.5}]_{0.25}$ <br>(148.5 g PhSi(OMe)$_3$ and 33.0 g (Me$_2$HSi)$_2$O) |
| 20 | $[MeSiO_{1.5}]_{0.5}[Me_2HSiO_{0.5}]_{0.5}$ <br>(204.0 g MeSi(OMe)$_3$ and 33.5 g (Me$_2$HSi)$_2$O) |

Curing and Pyrolysis An aliquot of a polymer material (ca. 20 g) was mixed with 20 g of the corresponding crosslinker material, along with 0.1 g of Pt as a solution known as Pt#4, and heated to 150°–175° C. for 20 to 45 minutes. An aliquot of the cured polymer (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 5.

TABLE 5

Ceramic Conversion

| Ex | Ceramic Yield | % C | % H (percent by weight) | % Si | % O | XRD* |
|---|---|---|---|---|---|---|
| 15 | 76.3 | 53.8 | 0.82 | 24.2 | | G&O |
| 16 | 69.1 | 60.7 | 0.6 | 22.3 | | G&O |
| 17 | 74.9 | 45.7 | 0.61 | 31.3 | | O |
| 18 | 62.1 | 20.2 | 0.26 | 47.0 | | O |
| 19 | 77.1 | 20.2 | 0.19 | 44.6 | | O |
| 20 | 75.6 | 47.7 | 0.48 | 27.8 | | G&O |

*O indicates a silica glass XRD pattern
G indicates a graphene pattern

Battery Cell Testing An aliquot of the ceramic material was made into an electrode as described above and assembled into a test cell as described above. The results are summarized in Table 6.

TABLE 6

Battery Testing

| Ex No | Pyrolysis Rate (°C./min) | Reversible Capacity (mAh/g) | Irreversible Capacity (mAh/g) | Avg Charge Voltage | Avg Discharge Voltage |
|---|---|---|---|---|---|
| 15 | 5.0 | 612 | 357 | 0.96 | 0.36 |
| 16 | 5.0 | 630 | 306 | 0.87 | 0.33 |
| 17 | 5.0 | 680 | 300 | 0.89 | 0.32 |
| 18 | 5.0 | 293 | 208 | 0.73 | 0.27 |
| 19 | 5.0 | 632 | 310 | 1.09 | 0.42 |
| 20 | 5.0 | | | | |

Example 21–24

MQ Materials Cured by Pt

Polymer Synthesis. This is a general procedure for the synthesis of organofunctional siloxanes:

MQ (with hydrogen) 1,1,3,3-tetramethyl-1,3-dihydridodisiloxane (0.74 mol equivalent), water (1.1 mol) and isopropyl alcohol (1.4 mol) were charged into a flask under cooling with an ice bath. Concentrated HCl (0.053 mol) was added into the mixture followed by agitating for 30 minutes. Tetraethylorthosilicate (0.18 mol) was added dropwise into the mixture and the mixture was stirred at ambient temperature for 3 hours. The resulting reaction mixture was neutralized with 50 w/v $NH_4Cl$ aqueous solution. The resulting organic layer was dried with $Na_2SO_4$ for 2 hours. The dried organic solution was filtered followed by evaporating at 50° C. and further stripping at 0.03 Torr and room temperature. The resultant organic solution was distilled in vacuo to obtain a major fraction at 39°–40° C./0.16 Torr. The yield was 40%.

MQ (with vinyl) 1,1,3,3-tetramethyl-1,3-divinyldisiloxane (0.53 mol equivalent), water (0.88 mol) and isopropyl alcohol (1.0 mol) were charged into a flask under heating at 40°–50° C. Concentrated HCl (0.051 mol) was added into the mixture followed by agitating for 30 minutes. Tetraethylorthosilicate (0.13 mol) was added drop-wise into the mixture and the mixture was stirred at ambient temperature for 3 hours. The resulting reaction mixture was neutralized with 50 w/v $NH_4Cl$ aqueous solution. The resulting organic layer was dried with $Na_2SO_4$ for 2 hours. The dried organic solution was filtered followed by evaporating at 50° C. and further stripping at 0.03 Torr and room temperature. The resultant organic solution was distilled in vacuo to obtain a major fraction at 65°–66° C./0.06 Torr. The yield was 50%. The other materials are summarized in Table 7.

TABLE 7

| No. | Description |
|---|---|
| 21 | $[HMe_2SiO_{0.5}]_{0.8}[SiO_{4/2}]_{0.2}$ and $[ViMe_2SiO_{0.5}]_{1.8}[SiO_{4/2}]_{0.2}$ |
| 22 | $[HMe_2SiO_{0.5}]_{0.33}[SiO_{4/2}]_{0.67}$ and $[ViMe_2SiO_{0.5}]_{0.33}[SiO_{4/2}]_{0.67}$ |
| 23 | $[HPh_2SiO_{0.5}]_{0.33}[SiO_{4/2}]_{0.67}$ and $[ViPh_2SiO_{0.5}]_{0.33}[SiO_{4/2}]_{0.67}$ |
| 24 | $[HPh_2SiO_{0.5}]_{0.8}[SiO_{4/2}]_{0.2}$ and $[ViPh_2SiO_{0.5}]_{0.8}[SiO_{4/2}]_{0.2}$ |

Curing and Pyrolysis SiH containing MQ resin and SiVi MQ resin were dissolved with 50 mL of toluene in the proportions listed in Table 8. 100 ppm of a platinum #4 solution and 1000 ppm $MeSi(OC(Me_2)C\equiv CH)_3$ were added into the MQ resin solution. The resulting solution was left at 30° C. in an oven to evaporate the toluene. The material was then cured by heating at 60° C. for 2 hours followed by heating the material to 120° C. at 10° C./hr with a 2 hour hold at 120° C. followed by cooling to 30° C. at −10° C./hour.

TABLE 8

Formulations

1 - 35 g hydrogen-containing MQ and 30.9 g vinyl containing MQ
2 - 35 g hydrogen-containing MQ and 36.8 g vinyl containing MQ
3 - 21.5 g hydrogen-containing MQ and 27.3 g vinyl containing MQ
4 - 5 g hydrogen-containing MQ and 6.3 g vinyl containing MQ An aliquot of the cured polymer (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 9.

TABLE 9

Ceramic Conversion

| Ex | Ceramic Yield | % C | % H (percent by weight) | % Si | % O | XRD* |
|---|---|---|---|---|---|---|
| 21 | 77.1 | 17.1 | 0.19 | 44.6 | | G&O |
| 22 | 55.9 | 26.3 | 0.33 | 47.6 | | O |
| 23 | 84.1 | 14.1 | 0.25 | 47.9 | | G&O |
| 24 | 69.9 | 38.7 | 0.47 | 30.4 | | G&O |

*O indicates a silica glass XRD pattern
G indicates a graphene pattern

Battery Cell Testing An aliquot of the ceramic material was made into an electrode as described above and assembled into a test cell as described above. The results are summarized in Table 10.

TABLE 10

Battery Testing

| Ex No | Pyrolysis Rate (°C./min) | Reversible Capacity (mAh/g) | Irreversible Capacity (mAh/g) | Avg Charge Voltage | Avg Discharge Voltage |
|---|---|---|---|---|---|
| 21 | 5.0 | 684 | 344 | 1.1 | 0.26 |
| 22 | 5.0 | 352 | 759 | 1.5 | 0.90 |
| 23 | 5.0 | 701 | 351 | 1.08 | 0.33 |
| 24 | 5.0 | 663 | 320 | 0.89 | 0.32 |

Examples 25–35

Sol-Gels

Sol-Gel Synthesis. These precursors were prepared in a method similar to that described by Chi In U.S. Pat. No. 4,460,639. The colloidal silica (Nalco 1034A at 34% solids) and the corresponding methoxy silane were cohydrolyzed under acidic conditions with rapid stirring. The pH of the reaction mixture was then adjusted to 7.5 to 8.0 with 1% aqueous ammonia, and the mixture allowed to gel and the volatiles evaporate over a 5 day period. The gels were then further dried for 16 h in a 100° C. oven and an additional 16 h in a 250° C. oven. The reactants and their ratios are given in Table 11.

TABLE 11

Polymer Synthesis

| No. | Description |
|---|---|
| 25 | 141.0 g colloidal silica |
| 26 | 126.9 g colloidal silica, 6.8 g MeSi(OMe)$_3$ |
| 27 | 98.7 g colloidal silica, 20.4 g MeSi(OMe)$_3$ |
| 28 | 70.5 g colloidal silica, 34.0 g MeSi(OMe)$_3$ |
| 29 | 42.3 g colloidal silica, 47.6 g MeSi(OMe)$_3$ |
| 30 | 14.1 g colloidal silica, 61.2 g MeSi(OMe)$_3$ and 15.0 g water |
| 31 | 126.9 g colloidal silica, 9.9 g PhSi(OMe)$_3$ |
| 32 | 98.7 g colloidal silica, 29.7 g PhSi(QMe)$_3$ |
| 33 | 70.5 g colloidal silica, 49.5 g PhSi(OMe)$_3$ |
| 34 | 42.3 g colloidal silica, 69.3 g PhSi(OMe)$_3$ |
| 35 | 14.1 g colloidal silica, 89.1 g MeSi(OMe)$_3$ and 15.0 g water |

Pyrolysis An aliquot of the dried gel (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 12.

TABLE 12

Ceramic Conversion

| Ex | Ceramic Yield | % C | % H (weight percent) | % Si | % O | XRD* |
|---|---|---|---|---|---|---|
| 25 | 99.2 | 0 | 0 | 51.7 | | O |
| 26 | 99.4 | 0.7 | 0 | 49.8 | | O |
| 27 | 94.7 | 2.5 | 0 | 54.0 | | O |
| 28 | 90.8 | 4.8 | 0 | 46.6 | | O |
| 29 | 60.3 | 4.6 | 0 | 45.6 | | O |
| 30 | 61.5 | 10.5 | 0.1 | 52.0 | | O |
| 31 | 96.3 | 4.4 | 0 | 44.5 | | O |
| 32 | 91.6 | 11.6 | 0 | 37.4 | | O |
| 33 | 87.2 | 18.8 | 0.2 | 31.6 | | O |
| 34 | 86.8 | 24.3 | 0.3 | 34.5 | | G&O |
| 35 | 69.3 | 41.6 | 0.5 | 27.9 | | G&O |

*O indicates a silica glass XRD pattern
G indicates a graphene pattern

Battery Cell Testing An aliquot of the ceramic material was made into an electrode as described above and assembled into a test cell as described above. The results are summarized in Table 13.

TABLE 13

Battery Testing

| Ex No | Pyrolysis Rate (°C./min) | Reversible Capacity (mAh/g) | Irreversible Capacity (mAh/g) | Avg Charge Voltage | Avg Discharge Voltage |
|---|---|---|---|---|---|
| 25 | 5.0 | 22 | 24 | | |
| 26 | 5.0 | 15 | 30 | | |
| 27 | 5.0 | 12 | 32 | | |
| 28 | 5.0 | 6 | 32 | | |
| 29 | 5.0 | 14 | 21 | | |
| 30 | 5.0 | 190 | 476 | 0.86 | 0.14 |
| 31 | 5.0 | | | | |
| 32 | 5.0 | 347 | 420 | 1.25 | 0.12 |
| 33 | 5.0 | | | | |
| 34 | 5.0 | 636 | 343 | 1.13 | 0.33 |
| 35 | 5.0 | | | | |

Example 36–43

Organic Modified Sol-Gels

Synthesis. In the procedure described by Schneider in J. Europ Ceram Soc;15, 1995, 675–81., a variety of methoxysilane materials were co hydrolyzed with a phenolic resin with stirring for 72 h while allowing for evaporation of the solvents. After this time the gel was dried 24 h at 80° C. and an additional 24 h at 175° C. The reactants used in each of these materials are listed in Table 14.

TABLE 14

Polymer Synthesis

| No. | Description |
|---|---|
| 36 | 40.0 g Varcum Phenolic resin, 21.0 g Si(OEt)$_4$, 7.5 g water and 20.0 g methanol |
| 37 | 40.0 g Varcum Phenolic resin, 26.5 g PhSi(OMe)$_3$, 7.5 g water and 20.0 g methanol |
| 38 | 30.0 g Varcum Phenolic resin, 36.0 g Ph2Si(OMe)$_2$, 5.5 g water and 20.0 g methanol |
| 39 | 40.0 g Varcum Phenolic resin |
| 40 | 40.0 g Georgia Pacific Phenolic resin, 21.0 g Si(OEt)$_4$, 7.5 g water and 20.0 g methanol |
| 41 | 40.0 g Georgia Pacific Phenolic resin, 26.5 g PhSi(OMe)$_3$, 7.5 g water and 20.0 g methanol |
| 42 | 30.0 g Georgia Pacific Phenolic resin, 36.0 g Ph2Si(OMe)$_2$, 5.5 g water and 20.0 g methanol |
| 43 | 40.0 g Georgia pacific Phenolic resin |

Pyrolysis An aliquot of the dried gel (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 15.

TABLE 15

Ceramic Conversion

| Ex | Ceramic Yield | % C | % H | % Si | % O | XRD* |
|----|---------------|------|------|------|------|------|
|    |               | (weight percent) | | | | |
| 36 | 63.8 | 58.7 | 0.2 | 16.4 |      | G&O |
| 37 | 62.5 | 78.2 | 0.3 | 8.9  |      | G&O |
| 38 | 38.8 | 86.3 | 0.3 | 4.0  |      | G&O |
| 39 | 56.0 | 95.4 | 0.3 | 0    |      | G   |
| 40 | 67.0 | 61.4 | 0.1 | 17.7 |      | G&O |
| 41 | 58.0 | 67.4 | 0.9 | 15.7 |      | G&O |
| 42 | 35.6 | 75.6 | 1.0 | 8.9  | 13.3 | G&O |
| 43 | 54.0 | 94.7 | 1.0 | 0    | 3.4  | G   |

Battery Cell Testing An aliquot of the ceramic material was made into an electrode as described above and assembled into a test cell as described above. The results are summarized in Table 16.

TABLE 16

Battery Testing

| Ex No | Pyrolysis Rate (°C./min) | Reversible Capacity (mAh/g) | Irreversible Capacity (mAh/g) | Avg Charge Voltage | Avg Discharge Voltage |
|-------|--------------------------|------------------------------|-------------------------------|--------------------|-----------------------|
| 36 | 5.0 | 160 | 120 | 0.71 | 0.34 |
| 37 | 5.0 | 450 | 230 | 1.05 |      |
| 38 | 5.0 |     |     |      |      |
| 39 | 5.0 |     |     |      |      |
| 40 | 5.0 | 420 | 220 | 1.08 | 0.33 |
| 41 | 5.0 |     |     |      |      |
| 42 | 5.0 |     |     |      |      |
| 43 | 5.0 |     |     |      |      |

Examples 44–48

Pitch Derivatives

Example 44

In a 150 mL flask equipped with a magnetic stirring bar was placed 26 g of pitch (Ashland Chemical A-240) dissolved in 75 mL of THF under argon. To this was added 0.1 mL of a platinum number 4 solution. Over a 30 minute period, 12 g of methylhydrogen cyclosiloxanes was added to the stirred solution. This mixture was then heated to 65° C. for 48 hours. The polymeric product was isolated by filtration and the solvent removed by rotary evaporation. This material was not treated or heated for cure any further prior to pyrolysis.

Example 45

In a 500 mL flask equipped with a magnetic stirring bar was placed 26 g of pitch (Crowley Chemical) dissolved in 250 g of THF under argon. To this was added 0.1 mL of a platinum number 4 solution. Over a 60 minute period, 45 g of the material for Example 19 was added to the stirred solution. This mixture was then heated to 65° C. for 16 hours. The polymeric product was isolated by filtration and the solvent removed by rotary evaporation. This material was not treated or heated for cure any further prior to pyrolysis.

Example 46

In a 250 mL flask equipped with a magnetic stirring bar was placed 26 g of pitch (Crowley Chemical) dissolved in 150 g of THF under argon. To this was added 0.1 mL of a platinum number 4 solution. Over a 60 minute period, 20 g of the material for Example 16 was added to the stirred solution. This mixture was then heated to 65° C. for 16 hours. The polymeric product was isolated by filtration and the solvent removed by rotary evaporation. This material was not treated or heated for cure any further prior to pyrolysis.

Example 47

In a 250 mL flask equipped with a magnetic stirring bar was placed 26 g of pitch (Crowley Chemical) dissolved in 150 mL of THF under argon. To this was added 0.1 mL of a platinum number 4 solution. Over a 30 minute period, 12 g of methylhydrogen cyclosiloxanes was added to the stirred solution. This mixture was then heated to 65° C. for 48 hours. The polymeric product was isolated by filtration and the solvent removed by rotary evaporation. This material was not treated or heated for cure any further prior to pyrolysis.

Example 48

In a 250 mL flask equipped with a magnetic stirring bar was placed 26 g of pitch (Crowley Chemical) dissolved in 150 mL of THF under argon. To this was added 0.1 mL of a platinum number 4 solution. Over a 30 minute period, 13 g of tetramethyldisiloxane was added to the stirred solution. This mixture was then heated to 65° C. for 48 hours. The polymeric product was isolated by filtration and the solvent removed by rotary evaporation. This material was not treated or heated for cure any further prior to pyrolysis.

Pyrolysis An aliquot of the dried gel (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 17.

TABLE 17

Ceramic Conversion

| Ex | Ceramic Yield | % C | % H | % Si | % O | XRD* |
|----|---------------|------|------|------|------|------|
|    |               | (weight percent) | | | | |
| 44 | 47.5 | 56.0 | 0.46 | 22.1 | | G&O |
| 45 | 61.0 | 56.2 | 0.5  | 23.8 | | G&O |
| 46 | 44.6 | 77.9 | 0.74 | 10.7 | | G&O |
| 47 | 52.7 | 60.0 | 0.45 | 23.4 | | G   |
| 48 | 36.4 | 94.7 | 0.68 | 2.2  | | G   |

Battery Cell Testing An aliquot of the ceramic material was made into an electrode as described above and assembled into a test cell as described above. The results are summarized in Table 18.

TABLE 18

Battery Testing

| Ex No | Pyrolysis Rate (°C./min) | Reversible Capacity (mAh/g) | Irreversible Capacity (mAh/g) | Avg Charge Voltage |
|-------|--------------------------|------------------------------|-------------------------------|--------------------|
| 44 | 5.0 | 694 | 202 | 1.08 |
| 45 | 5.0 | 700 | 300 |      |
| 46 | 5.0 | 450 | 200 |      |
| 47 | 5.0 | 660 | 230 |      |
| 48 | 5.0 |     |     |      |

Examples 49–51

Silylalkylene and Silylarylene Materials

Example 49

$(PhMeViSiO_{0.5})_{0.5}(MeSiCH_2O)_{0.5}$

In a 2 L necked flask equipped with a bottom drain was fitted with an overhead stirrer, water cooled condenser and a 500 mL addition funnel. In the flask was placed 500 g distilled water under argon. In the addition funnel was placed a toluene (250 g) solution of 1,1,4,4-tetrachloro-1,4-dimethylsilylethylene, 63.5 g, and phenylmethylvinylchlorosilane, 91 g. This chlorosilane mixture was then added over a 45 minute period and stirred vigorously for an additional 15 minutes. The lower water layer was then removed and the organic layer repeatedly washed with 500 g of water until the pH of the water wash was greater than 6. The organic layer was then rotovaped to dryness, 185 g toluene added to adjust the % solids to 40 and 18.5 g of a 3% aqueous KOH solution added. The reaction was then refluxed for 4 hours and azeotroped dry. The polymer was isolated by capping with 10 g of dimethylvinylchlorosilane, filtering and rotovaping to dryness.

Example 50

$(Me_2ViSiO_{0.5})_{0.5}(MeSiCH_2O)_{0.5}$

In a 2 L necked flask equipped with a bottom drain was fitted with an overhead stirrer, water cooled condenser and a 500 mL addition funnel. In the flask was placed 500 g distilled water under argon. In the addition funnel was placed a toluene (250 g) solution of 1,1,4,4-tetrachloro-1,4-dimethylsilylethylene, 63.5 g, and phenylmethylvinylchlorosilane, 60 g. This chlorosilane mixture was then added over a 45 minute period and stirred vigorously for an additional 15 minutes. The lower water layer was then removed and the organic layer repeatedly washed with 500 g of water until the pH of the water wash was greater than 6. The organic layer was then rotovaped to dryness, 185 g toluene added to adjust the % solids to 40 and 10.5 g of a 3% aqueous KOH solution added. The reaction was then refluxed for 4 hours and azeotroped dry. The polymer was isolated by capping with 10 g of dimethylvinylchlorosilane, filtering and rotovaping to dryness.

Example 51

$(ViSiO_{0.5})_{0.2}(Ph_2SiC_6H_4SiPh_2O)_{0.8}$

In a 500 mL 3 necked round bottom flask equipped with a bottom drain was fitted with an overhead stirrer and water cooled condenser was placed $HOPh_2SiC_6H_4SiPh_2OH$, 94.8 g, vinyltrimethoxysilane, 7.4 g, as a toluene 125 mL solution. To this was added water (0.25 g) and trifluoroacetic acid (0.5 g). The reaction was then refluxed 2 h, an additional 20 g of water was added and refluxed an additional 2 h. The reaction was cooled and neutralized with $CaCO_3$ (0.5 g) and the reaction distilled to a head temperature of greater than 90° C. The residue was dissolved in toluene (143 g) and 14.3 g of a 3% aqueous KOH solution added. The reaction was azeotroped dry capped with 2 g of dimethylvinylchlorosilane,. The polymer was isolated by filtration and the solution rotovapped to dryness.

Pyrolysis An aliquot of the dried gel (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. The results are summarized in Table 19.

TABLE 19

| | | Ceramic Conversion | | | |
|---|---|---|---|---|---|
| Ex | Ceramic Yield | % C | % H (weight percent) | % Si | % O | XRD* |
| 49 | 46.1 | 45.2 | 0.48 | 33.8 | | G&O |
| 50 | 64.8 | 31.4 | 0.43 | 43.1 | | G&O |
| 51 | 58.1 | 68.3 | 0.74 | 17.6 | | G&O |

Battery Cell Testing An aliquot of the ceramic material was made into an electrode as described above and assembled into a test cell as described above. The results are summarized in Table 20.

TABLE 20

| | Battery Testing | | | |
|---|---|---|---|---|
| Ex No | Pyrolysis Rate (°C./min) | Reversible Capacity (mAh/g) | Irreversible Capacity (mAh/g) | Avg Charge Voltage |
| 44 | 5.0 | 620 | 326 | 1.00 |
| 50 | 5.0 | 388 | 375 | 1.07 |
| 51 | 5.0 | 437 | 224 | 0.78 |

Examples 52

An aliquot of the materials listed in Table 21 (ca. 4 g) was placed in a graphite crucible and heated under a continuous argon purge at 5° C./min to 1100° C. and held at temperature for one hour before cooling to ambient temperature. The ceramic yield was calculated and the ceramic material made into an electrode as described above and assembled into a test cell as described above. The results are summarized in Table 21.

TABLE 21

| Ex No | Polymer | Char Yield | Rev Cap | Irr Cap | Avg Chg V |
|---|---|---|---|---|---|
| 52 | Ex 44 | 59.2 | 850 | 230 | 1.05 |

Examples 53–54

An aliquot of the materials listed in Table 22 (ca. 4 g) was placed in a graphite crucible and heated under a continuous argon purge at 5° C./min to 800° C. and held at temperature for one hour before cooling to ambient temperature. The ceramic yield was calculated and the ceramic material made into an electrode as described above and assembled into a test cell as described above. The results are summarized in Table 22.

TABLE 22

| Ex No | Polymer | Char Yield | Rev Cap | Irr Cap | Avg Chg V |
|---|---|---|---|---|---|
| 53 | Ex 7 | 85 | 310 | 400 | 1.12 |
| 54 | Ex 8 | 93 | 150 | 170 | 1.24 |

That which is claimed is:

1. A method of forming an electrode material for a lithium ion battery comprising:

(A) pyrolyzing a composition comprising a siloxane polymer of the structure $$(R^1R^2R^3SiO_{0.5})_w(R^4R^5SiO)_x(R^6SiO_{1.5})_y(SiO_{4/2})_z$$

wherein each $R^1$, $R^2$, $R^3$, $R^4$, $R^5$ and $R^6$ are independently selected from the group consisting of hydrogen and hydrocarbons of 1–20 carbon atoms, w is in the range of 0 to about 0.8, x is in the range of 0 to about 0.9, y is in the range of 0 to about 0.9, z is in the range of 0 to 0.9 and w+x+y+z=1 to form a ceramic material; and (B) introducing lithium ions into the ceramic material to form an electrode material.

2. The method of claim 1 wherein the composition comprising the siloxane polymer is cured prior to pyrolysis.

3. The method of claim 1 wherein the composition comprising the siloxane polymer is pyrolyzed at a temperature in the range of 700° to 1400° C. at a heating rate less than about 10° C./minute.

4. The method of claim 1 wherein the ceramic material of step (A) is formed into a powder, the powder blended with a binder and a diluent to form a mixture and the mixture formed into an electrode before the lithium ions are introduced.

5. The method of claim 1 wherein the siloxane polymer produces a char containing at least 0.5 weight percent excess carbon.

6. The method of claim 1 wherein the siloxane polymer has a char yield greater than about 50 weight percent.

7. The method of claim 1 wherein the composition comprising the siloxane polymer also contains a curing agent.

8. The method of claim 1 wherein the composition comprising the siloxane polymer also contains a carbonaceous material.

9. The method of claim 1 wherein the composition comprising the siloxane polymer also contains a filler.

10. The method of claim 1 wherein the siloxane polymer is a copolymer with a polymer selected from the group consisting of silalkylenes, silarylenes, silazanes, silanes, and organic polymers.

11. The method of claim 1 wherein the siloxane polymer is blended with a polymer selected from the group consisting of silalkylenes, silarylenes, silazanes, silanes, and organic polymers.

12. In a method of making a rechargeable lithium ion battery, the improvement comprising making an anode by a process comprising:

(A) pyrolyzing a composition comprising a siloxane polymer of the structure $$(R^1R^2R^3SiO_{0.5})_w(R^4R^5SiO)_x(R^6SiO_{1.5})_y(SiO_{4/2})_z$$

wherein each $R^1$, $R^2$, $R^3$, $R^4$, $R^5$ and $R^6$ are independently selected from the group consisting of hydrogen and a hydrocarbon, w is in the range of 0 to about 0.8, x is in the range of 0 to about 0.9, y is in the range of 0 to about 0.9, z is in the range of 0 to 0.9 and w+x+y+z=1 to form a ceramic material; and (B) introducing lithium ions into the ceramic material to form an anode.

* * * * *